(12) United States Patent
Kwatra et al.

(10) Patent No.: US 11,645,578 B2
(45) Date of Patent: May 9, 2023

(54) INTERACTIVE CONTENT MOBILITY AND OPEN WORLD MOVIE PRODUCTION

(71) Applicant: INTERNATIONAL BUSINESS MACHINES CORPORATION, Armonk, NY (US)

(72) Inventors: Shikhar Kwatra, Durham, NC (US); Adam Lee Griffin, Dubuque, IA (US); Jennifer L. Szkatulski, Rochester, MI (US); Michael Nicholas Virnoche, Flowery Branch, GA (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 16/686,300

(22) Filed: Nov. 18, 2019

(65) Prior Publication Data
US 2021/0150408 A1    May 20, 2021

(51) Int. Cl.
*G06N 20/00* (2019.01)
*G06F 9/451* (2018.01)

(52) U.S. Cl.
CPC ............. *G06N 20/00* (2019.01); *G06F 9/451* (2018.02)

(58) Field of Classification Search
CPC ........ G06N 20/00; G06F 9/451; H04H 60/33; H04N 21/44222; H04N 21/44218; H04N 21/466; H04N 21/4667
See application file for complete search history.

(56) References Cited

U.S. PATENT DOCUMENTS

| 9,536,329 | B2 | 1/2017 | Saxena et al. |
| 9,743,136 | B2 | 8/2017 | Meoded et al. |
| 9,983,670 | B2 | 5/2018 | Coleman et al. |
| 9,992,539 | B2 | 6/2018 | Wells et al. |
| 10,009,644 | B2 | 6/2018 | Aimone et al. |
| 10,070,192 | B2 | 9/2018 | Baratz |
| 10,235,690 | B2 | 3/2019 | Saccoman |
| 10,325,145 | B2 | 6/2019 | Hajiyev et al. |
| 11,375,256 | B1 * | 6/2022 | Dorner .................... G06N 3/04 |
| 2010/0070987 | A1 | 3/2010 | Amento et al. |

(Continued)

FOREIGN PATENT DOCUMENTS

WO    2019068035 A1    4/2019

OTHER PUBLICATIONS

X. Tao et al., "Real-time Personalized Content Catering via Viewer Sentiment Feedback: A QoE Perspective," IEEE Nov./Dec. 2015 (Year: 2015).*

(Continued)

*Primary Examiner* — Eric J Yoon
(74) *Attorney, Agent, or Firm* — Robert D. Bean

(57) ABSTRACT

According to one embodiment, a method, computer system, and computer program product for dynamically modifying interactive digital content based on viewer sentiment is provided. The present invention may include measuring, by one or more sensors, characteristics of viewers associated with a viewed portion of the interactive digital content, while the viewers are viewing the interactive digital content; inferring the sentiment of the viewers with respect to the viewed portion of the interactive digital content based on the measured characteristics; predicting content satisfying to the viewers based on the sentiment; and modifying the interactive digital content in real time based on the predicted content.

17 Claims, 7 Drawing Sheets

(56) References Cited

U.S. PATENT DOCUMENTS

| | | | |
|---|---|---|---|
| 2012/0140069 A1 | 6/2012 | Ding et al. | |
| 2013/0145385 A1* | 6/2013 | Aghajanyan | H04N 21/4667 |
| | | | 725/10 |
| 2013/0298146 A1* | 11/2013 | Conrad | G06Q 90/00 |
| | | | 725/35 |
| 2015/0020086 A1* | 1/2015 | Chen | H04H 60/46 |
| | | | 725/12 |
| 2015/0297109 A1 | 10/2015 | Garten et al. | |
| 2015/0331954 A1 | 11/2015 | Wickramasuriya et al. | |
| 2016/0088352 A1* | 3/2016 | Agarwal | H04N 21/44222 |
| | | | 725/12 |
| 2017/0220570 A1 | 8/2017 | Tilaye et al. | |
| 2017/0259120 A1 | 9/2017 | King et al. | |
| 2018/0103292 A1 | 4/2018 | Zheng | |
| 2018/0165854 A1* | 6/2018 | Du | G06N 20/00 |
| 2018/0205985 A1* | 7/2018 | Boudreau | H04N 21/44218 |
| 2019/0014378 A1 | 1/2019 | Shah et al. | |
| 2019/0019214 A1 | 1/2019 | Hanegby et al. | |
| 2021/0021898 A1* | 1/2021 | Lagares-Greenblatt | |
| | | | H04N 21/2668 |

OTHER PUBLICATIONS

H. Liu et al., "Gesture recognition for human-robot collaboration: A review," International Journal of Industrial Ergonomics 68, pp. 355-367, published Mar. 6, 2017 (Year: 2017).*

Business Wire article, "Enterprise Quantum Computing Market to Reach 2.2 Billion by 2025," published Aug. 13, 2018, downloaded from https://www.businesswire.com/news/home/20180813005168/en/Enterprise-Quantum-Computing-Market-to-Reach-2.2-Billion-by-2025-According-to-Tractica (Year: 2018).*

Mell et al., "The NIST Definition of Cloud Computing", Recommendations of the National Institute of Standards and Technology, NIST Special Publication 800-145, Sep. 2011, 7 pages.

Al-Otaibi et al., "Customer Satisfaction Measurement using Sentiment Analysis", (IJACSA) International Journal of Advanced Computer Science and Applications, vol. 9, No. 2, 2018, pp. 106-117.

EMOTIV, "Brain Controlled Technology", printed on Aug. 27, 2019, pp. 1-7, https://www.emotiv.com/brain-controlled-technology/.

EMOTIV, "Brain Research & Education", printed on Aug. 27, 2019, pp. 1-8, https://www.emotiv.com/neuroscience-research-education-solutions/.

Technavio, "Global Digital Video Content Market to Generate USD 121 Billion by 2020", Business Wire, Sep. 26, 2016, pp. 1-5, https://www.businesswire.com/news/home/20160926005923/en/Global-Digital-Video-Content-Market-to-Generate-USD-121-Billion-by-2020-Reports-Technavio.

EMOTIV, "Research Grade Neurotechnology", printed on Aug. 27, 2019, pp. 1-10, https://www.emotiv.com/.

Frey, "VIF: Virtual Interactive Fiction (with a twist)", arXiv:1606.02427v1, Jun. 8, 2016, 5 pages.

Gilroy et al., "A Brain-Computer Interface to a Plan-Based Narrative", Proceedings of the Twenty-Third International Joint Conference on Arlilicial Intelligence, Aug. 3, 2013, pp. 1997-2005.

Harrer, "Controlling Prosthetic Limbs With Thought and AI", IBM Research Blog, Jul. 23, 2018, 7 pages.

IBM, "The Brain's Architecture, efficiency . . . on a chip", IBM Research Blog, Dec. 19, 2016, 7 pages.

Motions, "Top 6 Brain Processes That Can Be Measured With EEG", Blog, Sep. 29, 2015, 6 pages, https://motions.com/blog/top-6-brain-processes-measured-eeg/.

Disclosed Anonymously, "Method and System for Providing Multimedia Content based on User Brain Activity", an IP.com Prior Art Database Technical Disclosure, IP.com No. IPCOM000254129D, IP.com Electronic Publication Date: Jun. 4, 2018, 3 pages.

Jokitulppo, "Real-time sentiment analysis of video calls", Master's Thesis, Aalto University, School of Science, Master's Programme in Computer, Communication and Information Sciences, Mar. 17, 2019, 58 pages.

Kang et al., "Review-based measurement of customer satisfaction in mobile service: Sentiment analysis and VIKOR approach", Expert Systems with Applications, (2013), pp. 1-10.

Liao, "Netflix wants to make more interactive shows after the success of Black Mirror: Bandersnatch", The Verge, Mar. 12, 2019, 2 pages.

Lynch, "I controlled the latest X-Men movie with my mind—and one day you might, too", Nov. 9, 2016, World of tech, 4 pages, https://www.techradar.com/news/mind-control-for-movies-why-the-future-of-film-may-be-a-cinematic-cerebro.

MyndPlay, "Creating Interactive Video Content for the MyndPlay Platform", 12 pages, https://store.myndplay.com/PDF/Createfinal.pdf.

Shu et al., "A Review of Emotion Recognition Using Physiological Signals", Sensors, Jul. 2018, vol. 18, No. 7, 46 pages.

Ramchurn et al., "Designing Musical Soundtracks for Brain Controlled Interface (BCI) Systems", AM'18, Sep. 12-14, 2018, Association for Computing Machinery, 8 pages.

Song et al., "PerSentiment: A Personalized Sentiment Classification System for Microblog Users", WWW'16 Companion, Apr. 11-15, 2016, pp. 255-258.

* cited by examiner

INTERACTIVE CONTENT MOBILITY AND OPEN WORLD MOVIE PRODUCTION

BACKGROUND

The present invention relates, generally, to the field of computing, and more particularly to digital content creation.

Digital content creation is the field concerned with creating digital media to be consumed by an end user in particular contexts, such as entertainment. The demand for digital content continues to grow: over the last decade, streaming media magnates such as Blockbuster and Netflix have dominated the media industry, as well as pinch service providers such as cable and satellite TV. Currently, streaming media is executed via an array of expanding CDNs, or Content Delivery Networks. The goal of a CDN is to provide high availability and high performance by distributing the service/media spatially relative to end-users. The field of digital content creation seeks, in part, to employ streaming media in leveraging the internet backbone or ecosystem, and in the next phase of the evolution of content that traverses that infrastructure.

SUMMARY

According to one embodiment, a method, computer system, and computer program product for dynamically modifying interactive digital content based on viewer sentiment is provided. The present invention may include measuring, by one or more sensors, characteristics of viewers associated with a viewed portion of the interactive digital content, while the viewers are viewing the interactive digital content; inferring the sentiment of the viewers with respect to the viewed portion of the interactive digital content based on the measured characteristics; predicting content satisfying to the viewers based on the sentiment; and modifying the interactive digital content in real time based on the predicted content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
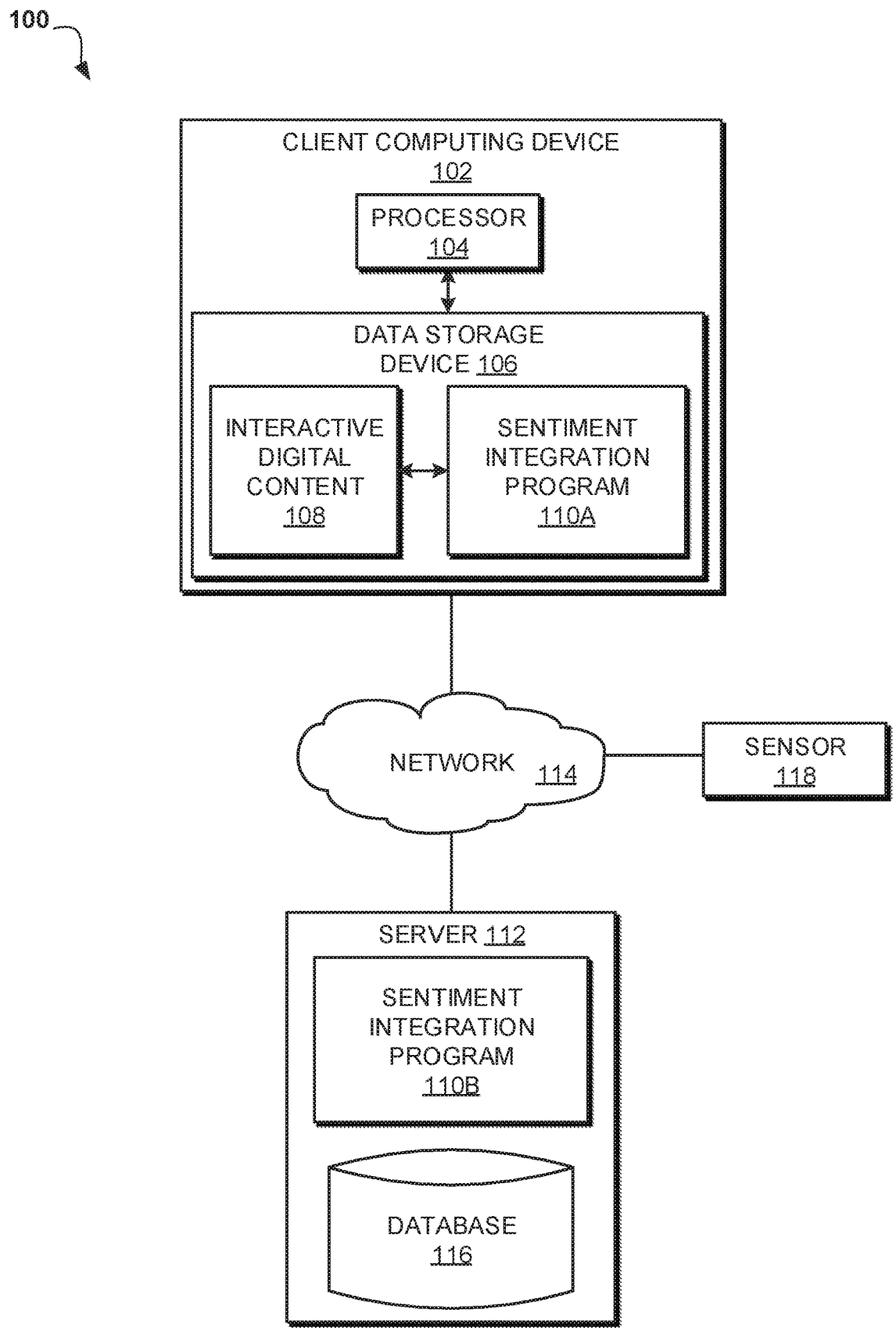
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital content creation. The following described exemplary embodiments provide a system, method, and program product to, among other things, capture real-time viewer sentiment, and to incorporate that sentiment in real-time or near-real-time live interaction for increased viewer engagement with the content being presented. Therefore, the present embodiment has the capacity to improve the technical field of digital content creation by dynamically identifying the inflection points in presented content and then modifying the content, in real-time or near-real-time, based on viewer sentiment, thereby creating content that dynamically adapts and responds to viewer sentiments to improve viewer engagement and satisfaction.

As previously described, digital content creation is the field concerned with creating digital media to be consumed by an end user in particular contexts, such as entertainment. The demand for digital content continues to grow: over the last decade, streaming media magnates have dominated the media industry, as well as pinch service providers such as cable and satellite TV. Currently, streaming media is executed via an array of expanding CDNs, or Content Delivery Networks. The goal of a CDN is to provide high availability and high performance by distributing the service/media spatially relative to end-users. The field of digital content creation seeks, in part, to employ streaming media in leveraging the internet backbone or ecosystem, and in the next phase of the evolution of content that traverses that infrastructure.

CYOA, or "Choose Your Own Adventure" storylines originate in books or 'gamebooks' where the reader interacts with the storyline and chooses written text options or 'page jumps' that dictate the ultimate outcome in the story. This same interactivity has recently been included in streaming media content; viewers choose the direction of content flow to build upon the storyline as they so choose. These choices are empowered by levels of engagement and emotional attachment to specific characters or plot lines as the story progresses; hence each viewer has a detectable or predictable level of interaction with the content. Today's level of interaction and selection is best likened to an active conscious decision-making effort on the part of the viewer based on the level of enjoyment, curiosity, engagement, or emotional response to the content or characters being presented. A drawback of this approach, however, is that manual interaction is required for the story sequence to resume or move on to the next 'chapter' within the storyline, which interrupts the sentiment of the viewer and may cause a break in interest, or a measurable drop in focus and attention, as one might experience when receiving a text message while engaged in an activity.

Additionally, content providers themselves may limit the number of interactive choices presented to the viewer to avoid diminishing the flow and engagement of the viewer with frequent interruption; unnecessary complexity can damage the entertainment value of content. However, if there existed a means to execute choices without interrupting the viewer, a content provider could build far more ambitious interactive models and choices into the story that hew ever more closely to potential sentimental arcs of viewers. As such, it may be advantageous to, among other things, implement a system that dynamically tailors content to a viewer's emotional and sentiment in real time to produce content that is more desirable to the viewer without interrupting the viewer's engagement in the content.

According to one embodiment, the invention is a system and method that measures characteristics of viewers as they consume content; the characteristics are analyzed and incorporated in real time or near real time to modify the content as it is presented to the viewers.

In some embodiments, the characteristics may be any data, capturable in real time, that may indicate the current sentiment of a viewer as it pertains to the content being presented to the viewer. The sentiment of the viewer may include the emotions of the viewer, such as happy, sad, bored, or excited, and so on, and may further include the viewer's engagement with the content being presented, as well as other mental factors that may be relevant to the viewer's emotions or engagement, such as tiredness or general stress. In some embodiments, the system may employ a sensor or combination of sensors to capture real-time sentiment metrics, such as visual and infrared cameras, electroencephalography (EEG) sensors, microphones, accelerometers, motion detectors, vitality trackers, et cetera. The real-time sentiment metrics may, for example, include voltage fluctuations in a viewer's brain activity from an EEG sensor, eye-tracking, facial expressions, speech and other sounds, heart rate, pupil width, head movement, body language, et cetera.

In some embodiments, the characteristics may include contextual elements, pertaining to the broader context of the viewer's viewing experience external to the viewer, where such contextual elements would be useful in measuring the sentiment of the viewer. For example, the system may consider elements in the viewer's environment, such as the presence of distractions such as other screens, the number of other viewers, sources of noise besides the content, events such as new viewers entering the room, the activity of pets, location of a viewer such as a living room, movie theater, plane or train, et cetera. The system may also consider physical activities that the viewer is engaged in, such as eating popcorn, talking to someone, looking at a phone or another screen, petting a dog, et cetera.

In some embodiments, the system may define a default sentiment model as a baseline, by mapping out which characteristics correspond with which emotions and/or sentiments. For instance, the system may establish that sustained eye contact indicates engagement with the content, while frequent eye activity indicates faltering engagement. Laughter or smiles may indicate happiness, frowns may indicate sadness or disapproval, cocked head may indicate curiosity or confusion, wide eyes may indicate fear. The system may incorporate these relationships into the default sentiment model based on a user's input, for instance where a user specifically indicates the relationship between the sentiment model and its corresponding emotions or sentiments. In some embodiments, the system may classify sentiment metrics as corresponding with particular emotions or sentiments based on machine learning.

In some embodiments, the system may define multiple default sentiment models, and apply a sentiment model to an individual viewer based on the characteristics of the viewer that might increase the accuracy of the system in identifying the sentiment of the viewer, such as age, sex, demographic classifications, et cetera. For example, the system may construct a default sentiment model for viewers aged 0-12, one for viewers aged 12-18, one for viewers aged 18-30, one for viewers aged 30-60, and one for viewers aged 60+. The system may create any number of default sentiment models at any level of granularity, from a single default sentiment model for all viewers to a large number of default sentiment models pertaining to small numbers of viewers possessing specific characteristics or combinations of characteristics, depending for instance on computing resources available and desired accuracy of the sentiment inferences.

In some embodiments, the system may associate each viewer with a profile, and may identify viewers to provide more tailored and accurate sentiment determination. The profile may include any information specific to a viewer which may improve the efficacy of the system in analyzing the sentiment of the viewer or modifying the content. For instance, the profile might contain the stored sentiment metrics of the viewer, past content viewed by the viewer, viewer preferences, past sentiment analyses, feedback regarding the success or failure of the system in associating viewer sentimental metrics with sentiments in the course of sentiment determination, past modifications that the system made to content presented to the viewer, feedback regarding the success or failure of the system in modifying the content to improve the viewer's engagement or sentiment, et cetera. The profile may also contain biometric information, such as images of the viewer's face, retina, height, and any other information that the system could use to identify a viewer and match the viewer to a specific profile.

In some embodiments, the system may identify the viewer in order to match the viewer with the viewer's profile. For example, the system may identify the viewer via a camera utilizing facial recognition technology, matching against the list of viewer images in the stored profiles. The system may additionally use any other identification techniques, such as ocular scans including pupillometry or retinal scans, voice authentication, an RFID tag or other piece of hardware carried on the person of the viewer, et cetera. In some embodiments, the system may be unable to identify the viewer, and may instead identify characteristics of the viewer in order to match the viewer with the closest corresponding default sentiment model.

In some embodiments, the system may modify the content presented to the viewer based on the sentiment identified by the system so as to best satisfy the viewer. The system may use historical data to infer which content modifications produce which effects in viewer sentiments, and may infer or receive from a viewer a desired sentiment, which may indicate an improvement in the viewer's content viewing experience. The desired sentiment may be improved engagement, satisfaction happiness, or any other emotion. The system may also take into account the nature of the content in prioritizing sentiments: for example, frightened viewers may be desirable when the content is a horror movie, while undesirable in other contexts, and so the system may modify the content to increase fright in the viewers, and/or may prioritize minimizing fright less than in other contexts. In lighter content, the system may prioritize viewer happiness. In comedies, the system may prioritize laughter. In some embodiments, such as where there is only one viewer and the system successfully identifies the viewer, the system may alter the content based on that viewer's preferences. For instance, if the viewer has expressed a dislike of the horror genre, the system may prioritize modifying the content to minimize fright in the viewer, perhaps even where the content is within the horror genre. Where there are multiple viewers, the system may simply seek to make modifications most likely to improve engagement in a majority of viewers.

In some embodiments, such as where there are multiple viewers, the system may employ a normalized feature scaling matrix in order to generate the optimal normalized predicted output considering above state parameters, environmental variables, and a normalized reward function to ameliorate the content output.

In some embodiments, such as where there are multiple viewers, the system may weight the viewers by priority when determining how to best modify the content; in other words, the system may prioritize the engagement of certain viewers over the engagement of others in choosing content. For example, the system may consider new arrivals to be lower priority than the group of viewers who had been watching from the beginning. Likewise, a child may be a lower priority than adults. The system may also prioritize viewers who own the system on which the content is being displayed, or viewers who have displayed constant engagement. The system may assign weights to each viewer based on a number of factors, such as age, engagement, time since detection by the system, magnitude of viewer sentiment or predicted change in viewer sentiment in response to a content modification, et cetera, and may consider the weighted values when choosing modifications to make to the content. For instance, the system may only consider viewers whose weights exceed a certain threshold.

In some embodiments, the system may prioritize the viewers according to the quality or quantity of the real-time sentiment metrics available to each given viewer. In some systems, different real-time sentiment metrics may be available on different viewers, or may be provided via sensors of differing quality. As an example, perhaps a single piece of content is being displayed to three viewers on a monitor; the first viewer is sitting directly in front of the monitor, visible to a low-resolution camera integrated into the monitor. The second viewer is sitting to the left of the first viewer, visible to a high-definition webcam. The third viewer is sitting to the right of the first viewer, out of sight of the cameras but is wearing an EEG-capable headset. The system may struggle to recognize the facial expressions of the first viewer due to the low resolution of the camera, resulting in reduced accuracy and increased chance of error in detecting the second viewer's sentiment. The system may more accurately assess the sentiment of the second viewer thanks to the superior webcam. The EEG-capable headset on the third viewer may provide the best quality sentiment data of the three, as EEG data in general provides a more detailed and accurate conception of a viewer's sentiment than facial recognition. As such, the system may prioritize the third viewer highest, the second viewer below that, and the first viewer lowest, to minimize the effect of content modifications made based on erroneous sentiment determinations. In another example, a viewer within sight of two cameras might be prioritized over a viewer within sight of only one camera, as more data is available on the first viewer than the second so sentiment inferences are more likely to be accurate.

In some embodiments, the system may map the identified sentiment into a content decision tree pertaining to the content. The content decision tree may be a tree representing the flow of the content; in traditional, linear, non-editable content, the decision tree would not be a tree, but rather an unbroken line traveling from a root node representing the introduction to a leaf node representing the conclusion. In contrast, content that can be edited may be represented as a tree structure, where each branch point represents a place in the content where the content may take one of multiple directions. For instance, if the content is a story, the branch point may occur where a character may either live or die; if the character dies, the story continues in one direction, whereas if the character lives, the story continues in a radically different direction. The system may determine which branch in the content to take based on the inferred viewer sentiment. For example, if the branch point pertains to a character living or dying, the system may choose a branch based on how beloved the character is to the viewers.

In some embodiments, the system may construct the content decision tree for a given article of interactive digital content based on the different possibilities provided to the system within the content. For instance, a content provider may provide the system with predictive video content with two possible modular video segments that may be swapped in at the midpoint of the content, and four possible modular video segments representing two alternate endings for each of the previous two modular video segments; the system may accordingly construct a tree that would split into two branches at the midpoint, with each branch separating into two more branches towards the end, with a final total of four branches. In another example, a content provider may provide the system with a short comedy skit, with five different jokes that may be swapped in at a first point, and three different jokes that may be swapped in at a second point. The system may create a tree that splits into five branches at the first point, and each of those five branches splits into three more branches at the second point, for a total of fifteen branches. The constructed content decision tree may represent all possible narrative routes that the system could take within a discrete article of interactive digital content. In some embodiments, the system may generate a content decision tree with branches only for the content modifications selected by the system based on identified viewer sentiment.

In some embodiments, the system may modify the content at a more granular level than swapping out modular content blocks; the system may modify individual supporting elements of the interactive digital content. Supporting elements may be any subset of the bundle of audiovisual components that comprise the interactive digital content. For instance, if the interactive digital content is a movie, the supporting elements may be music, video filters, background objects, et cetera. Based on inferred viewer sentiment, the system may, for example, change the backing audio track of a scene from somber to upbeat, or may remove or enhance loud startling sounds. The system may also add brighter or darker filters to change the mood of a scene, or add startling background elements to cause surprise and increase engagement. In some embodiments, such as where the content decision tree is generated dynamically, the system may incorporate any modifications to supporting elements into the content decision tree as branch points.

In some embodiments, the system may send the output of the content decision tree into a semi-supervised reinforcement learning module as part of an ensemble learning approach, in order to continuously predict the next reward function based on state parameters, and the content being played for the specific viewer.

In some embodiments, the system may modify environmental factors based on inferred viewer sentiment and sensor data. By collecting information such as body temperature, EEG output, eye movement tracking, and overall restlessness and movement, the system may determine the effect of lighting levels, temperatures, seat comfort, lighting levels, and various other environmental factors on the viewer's content-viewing experience. The system may adjust environmental factors to improve the viewer's content-viewing experience, such as by interfacing with IoT devices on the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to capture real-time viewer sentiment, and to incorporate that sentiment in real-time or near-real-time live interaction for increased viewer engagement with the content being presented.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and/or servers 112 and/or sensors 118, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run interactive digital content 108 and a sentiment integration program 110A and communicate with the server 112 and sensor 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

Interactive digital content 108 may be received from a content provider, and may comprise digital audiovisual content with modular content elements that may optionally be integrated into and/or removed from the interactive digital content 108 to create a seamless but tailored viewing experience. The interactive digital content 108 may further include tags corresponding to each modular content element that describe the characteristics of the content that might be relevant to the sentiment of a viewer. For instance, the genre of the content, emotions that the content may evoke, and/or descriptions of the modular content (joke about cats, main character makes an important choice, etc). Interactive digital content 108 is depicted as residing within client computing device 102, but in other embodiments may be located on network 114, server 112, and/or database 116.

The server computer 112 may be a laptop computer, netbook computer, personal computer (PC), a desktop computer, or any programmable electronic device or any network of programmable electronic devices capable of hosting and running a sentiment integration program 110B and a database 116 and communicating with the client computing device 102 and sensor 118 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Sensor 118 may be any sensor capable of capturing real-time sentiment metrics, including visual and infrared cameras, electroencephalography (EEG) sensors, microphones, accelerometers, motion detectors, vitality trackers, et cetera. Sensor 118 may also be enabled to communicate with network 114, or may be integrated into or otherwise in communication with client computing device 102 or server 112.

According to the present embodiment, the sentiment integration program 110A, 110B may be a program enabled to capture real-time viewer sentiment, and to incorporate that sentiment in real-time or near-real-time live interaction for increased viewer engagement with the content being presented. The sentiment integration may be located on client computing device 102 or server 112 or on any other device located within network 114. Furthermore, sentiment integration may be distributed in its operation over multiple devices, such as client computing device 102 and server 112. The sentiment integration method is explained in further detail below with respect to FIG. 2.

Figure 2:
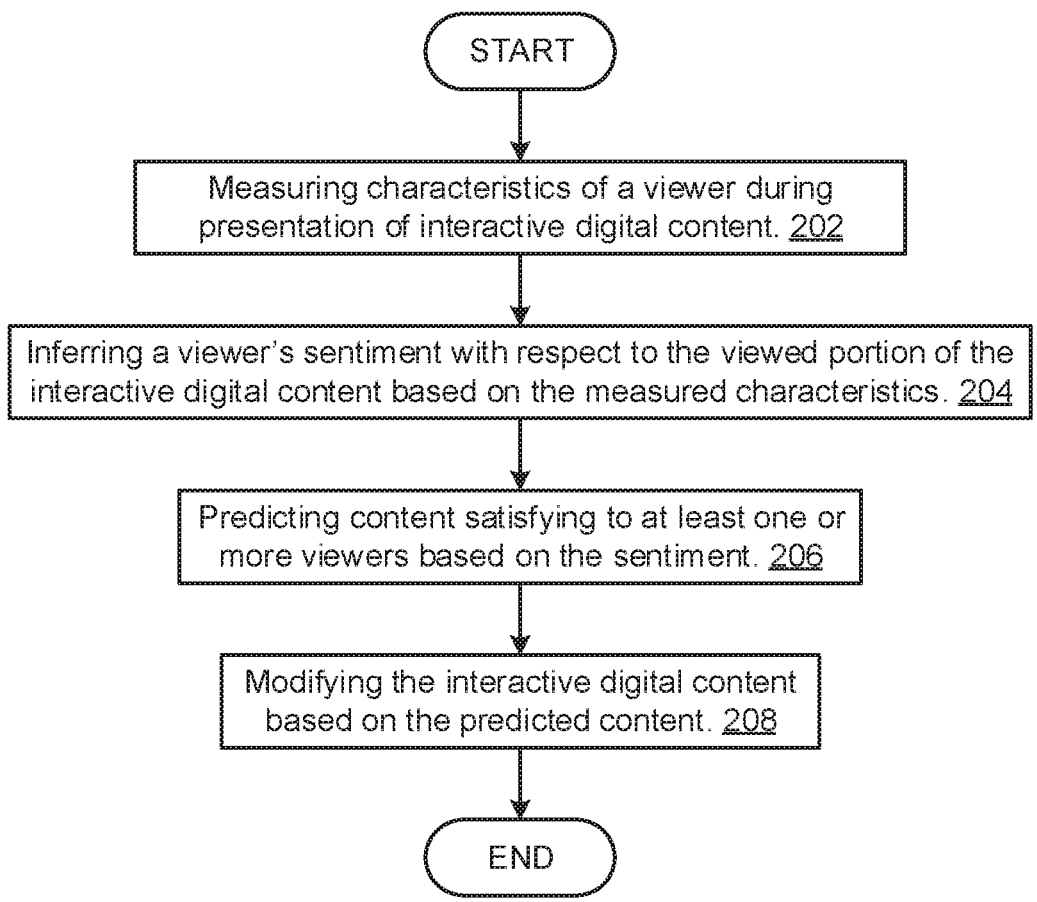
FIG. 2 is an operational flowchart illustrating a sentiment integration process according to at least one embodiment.

Referring now to FIG. 2, an operational flowchart illustrating a sentiment integration process 200 is depicted according to at least one embodiment. At 202, the sentiment integration program 110A, 110B measures characteristics of a viewer during presentation of interactive digital content 108. The characteristics may be any physical measurements, capturable in real time, that may indicate the current sentiment of a viewer as it pertains to the interactive digital content 108 being currently presented to the viewer, including, for example, any combination of the following: voltage fluctuations in a viewer's brain activity from an EEG sensor, eye movement, facial expressions, speech and other sounds, heart rate, pupil width, head movement, body language, et cetera. The sentiment of the viewer may include the emotions of the viewer, such as happy, sad, bored, or excited, and so on, and may further include the viewer's engagement with the content being presented, as well as other mental factors that may be relevant to the viewer's emotions or engagement, such as tiredness or general stress. The sentiment integration program 110A, 110B may employ one or more of sensor 118 to record and store characteristics in real time for the duration that the viewer is viewing interactive digital content 108.

At 204, the sentiment integration program 110A, 110B may infer a viewer's sentiment with respect to the viewed portion of the interactive digital content 108 based on the measured characteristics and historical data. The sentiment may represent the viewer's sentiment with regard to the portion of interactive content that the viewer has already viewed. The sentiment may include a general sentiment pertaining to the content as a whole, such as engaged, happy, frightened, bored, et cetera, and/or may include specific sentiment pertaining to individual aspects of the viewed interactive digital content 108, such as the viewer's opinion of each of several characters, the viewer's emotional reaction to multiple different plots within the episode, et cetera. The sentiment integration program 110A, 110B may infer sentiment by comparing the measured characteristics to known relationships between characteristics, or combinations of characteristics, and sentiments. The sentiment integration program 110A, 110B may rely on a list of relationships between sentiments and characteristics explicitly pre-furnished by a user, or may rely on a machine learning model and a corpus of historical data to identify relationships. For example, where sentiment integration program 110A, 110B detects, via sensor, that a viewer is looking at the content and smiling, the sentiment integration program 110A, 110B may compare these characteristics against historical data where in similar situations (similar content, viewer was looking at the content and smiling) the viewer was exhibiting happiness, and therefore conclude that the viewer in the present case is exhibiting the same sentiment. In some embodiments, such as where the interactive digital content 108 contains characters or story continuity from an article of interactive digital content 108 previously viewed by the viewer, and regarding which historical data for that viewer is available, the viewer's sentiment may be based on sentiment data from the previously viewed interactive digital content 108.

At 206, the sentiment integration program 110A, 110B predicts content satisfying to at least one or more viewers based on the sentiment. The sentiment integration program 110A, 110B may predict content satisfying to viewers by identifying content that produces satisfaction when a viewer is experiencing a particular sentiment. The sentiment integration program 110A, 110B may utilize a pre-provided list of relationships between sentiments and satisfying content. The sentiment integration program 110A, 110B may also utilize a machine learning model with a corpus of historical data for identifying patterns between sentiment and content that produces satisfaction. For example, the sentiment integration program 110A, 110B may search for instances in the past where the sentiment of historical viewers of interactive digital content matched the sentiment of the current viewer, and where modifications to the content improved the sentiment of the historical viewer, such as by increasing engagement, happiness, satisfaction, and choose a modification for the present viewer that is similar to the modification made for the historical viewer (similar tags, genre, content, characters). In some embodiments, the sentiment integration program 110A, 110B may search a list of all modular content provided with the interactive digital content 108 to predict which of the list of modular content would best improve viewer satisfaction.

At 208, the sentiment integration program 110A, 110B modifies the interactive digital content 108 based on the predicted content. The sentiment integration program 110A, 110B may modify the interactive digital content 108 by swapping in the modular content most predicted to increase viewer satisfaction at pre-determined branch points in the interactive digital content 108. In some embodiments, such as where the predicted content is music or visual filters that do not correspond to particular moments in the interactive digital content 108, sentiment integration program 110A, 110B may integrate modular content at any time.

Figure 3:
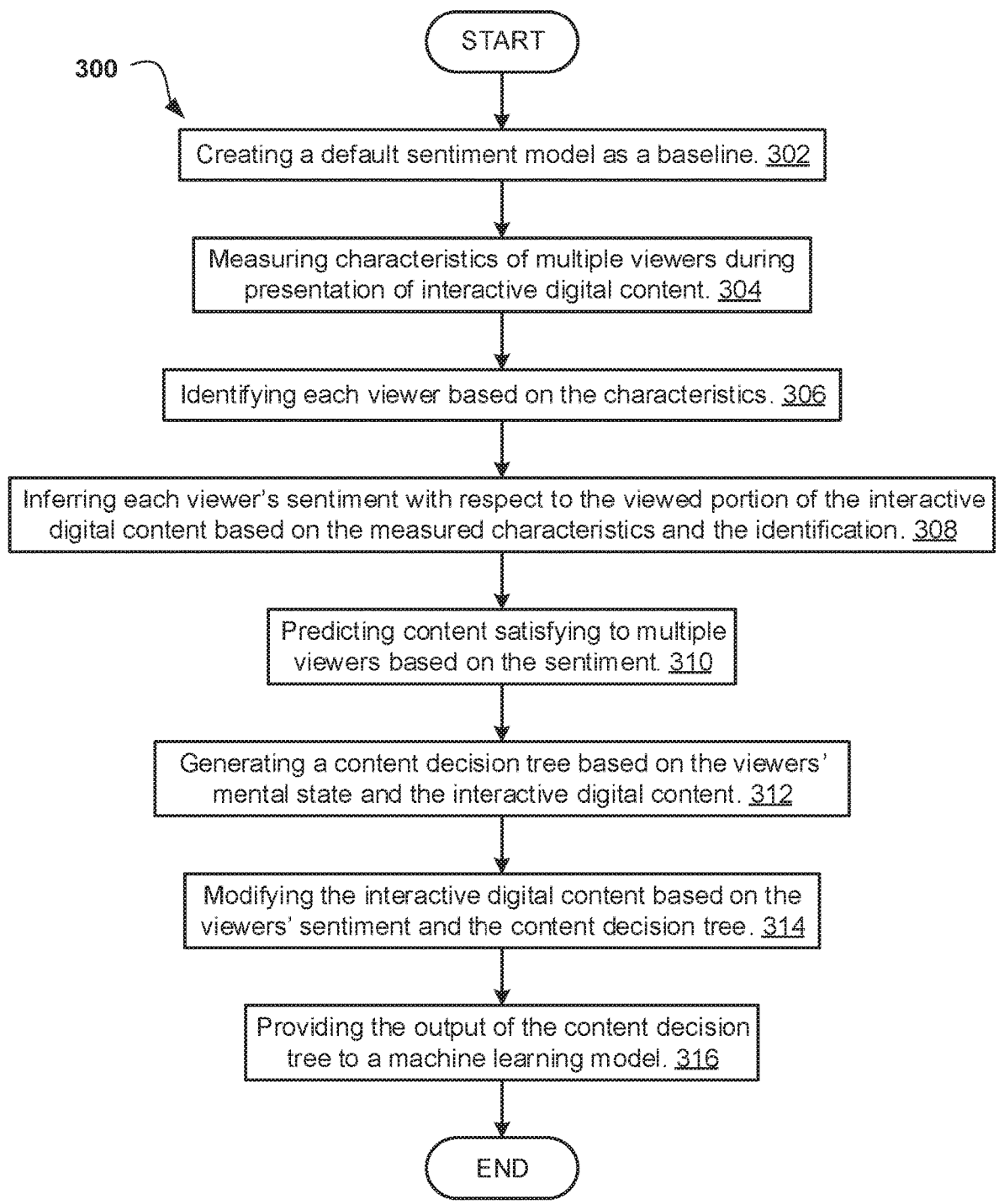
FIG. 3 is an operational flowchart illustrating a sentiment integration process according to at least one embodiment.

Referring now to FIG. 3, an operational flowchart illustrating a sentiment integration process 300 is depicted according to at least one embodiment. At 302, the sentiment integration program 110A, 110B creates a default sentiment model as a baseline. The default sentiment model may be a model representing which sentiment metrics correspond with which sentiments for a generic viewer. The sentiment integration program 110A, 110B may define a default sentiment model as a baseline by mapping out relationships between characteristics and sentiments, based for instance on correlations observed in historical sentiment integration data, or as specifically indicated by a user. In some embodiments the sentiment integration program 110A, 110B may receive one or more default sentiment models rather than, or in addition to, creating them. In some embodiments, the sentiment integration program 110A, 110B may define multiple default sentiment models representing relationships between sentiment metrics and sentiments for viewers with particular characteristics that distinguish them from the generic viewer in ways that are relevant to the accuracy of inferred viewer sentiment. Such characteristics may include age, sex, or demographic classifications.

At 304, the sentiment integration program 110A, 110B measures characteristics of multiple viewers during presentation of interactive digital content 108. The sentiment integration program 110A, 110B may detect the presence of multiple viewers at once, such as using facial detection, sound localization, multiple input feeds from EEG machines, et cetera. When there are multiple viewers consuming the content at once, the sentiment integration program 110A, 110B may distinguish between each separate viewer and maintain separate measurements of each viewer's characteristics.

At 306, the sentiment integration program 110A, 110B may identify a viewer based on the characteristics. The sentiment integration program 110A, 110B may identify a viewer by utilizing measured characteristics of the viewer such as height, age, voice, and/or facial features to match against a database of profiles comprising known viewers and their corresponding identifying features. If the sentiment integration program 110A, 110B cannot identify the viewer, the sentiment integration program 110A, 110B may create a new profile and store identifying features of the viewer in order to identify the viewer in the future. In some embodiments, the sentiment integration program 110A, 110B may receive profiles from an external source, or may prompt the viewer to set up a profile. In some embodiments, such as where there are multiple default sentiment models, and where sentiment integration program 110A, 110B cannot match a viewer with a profile, sentiment integration program 110A, 110B may use the measured characteristics to match the viewer with the most relevant default sentiment model.

At 308, the sentiment integration program 110A, 110B may infer a viewer's sentiment with respect to the viewed portion of the interactive digital content 108 based on the measured characteristics and the identification. The sentiment may represent the viewer's sentiment with regard to the portion of interactive content that the viewer has already viewed. The sentiment integration program 110A, 110B may infer sentiment by comparing the measured characteristics to known relationships between characteristics, or combinations of characteristics, and sentiments. If the viewer is identified and associated with a profile, the sentiment integration program 110A, 110B may rely on a list of relationships between sentiments and characteristics associated with the profile, which may have been pre-furnished by the viewer or may have been identified via a machine learning model and a corpus of historical data specific to that viewer. If the viewer is not successfully identified, but is matched to a default sentiment model, sentiment integration program 110A, 110B may infer sentiment by comparing the characteristics against the relationships enumerated within the default sentiment model. The sentiment integration program 110A, 110B may infer the viewer's sentiment at intervals to maintain a constant picture of the viewer's sentiment, and/or may infer the viewer's sentiment only at or prior to points during the runtime of the interactive digital content 108 where modular content elements may be selected.

At 310, the sentiment integration program 110A, 110B predicts content satisfying to multiple viewers based on the sentiment. The sentiment integration program 110A, 110B may predict content satisfying to viewers by identifying content that produces satisfaction when a viewer is experiencing a particular sentiment. The sentiment integration program 110A, 110B may predict content satisfying to each viewer, and select the modular content that would be satisfying to a majority of viewers. The sentiment integration program 110A, 110B may assign a weight to each viewer when predicting satisfying content, where the weight represents the priority of the viewer in predicting content; viewers with higher weight, for instance, may have their satisfaction prioritized more highly than viewers with lower weights. Priority of a viewer may be based on one or a combination of multiple factors. For example, the sentiment integration program 110A, 110B may prioritize the viewers according to whether the viewer's age matches the target audience of the content, time spent viewing the content, level of engagement with the content, et cetera. Additionally, the sentiment integration program 110A, 110B may prioritize viewers based on the quality and/or quantity of the measured characteristics available for each given viewer; the fidelity, reliability, accuracy, et cetera of the sensor or sensors measuring the characteristics, or the inherent usefulness of the class of sensors (for instance, facial recognition measurements from a camera may be inherently more useful in determining sentiment than a motion detector), may be enumerated for each viewer such that viewers with higher quality or more accurate sensor data may be prioritized more highly. The priority may further or alternatively be based on the predicted magnitude of the satisfaction that the viewer is likely to experience; for instance, where a character might live or die, and one viewer loves the character and three viewers are ambivalent, sentiment integration program 110A, 110B may prioritize the satisfaction of the viewer with strong feelings on the subject, and calculate her weighted priority value accordingly. The sentiment integration program 110A, 110B may predict satisfying content based on the weighted sum of viewers whose satisfaction would be improved by a given element of content.

At 312, the sentiment integration program 110A, 110B generates a content decision tree based on the viewer's sentiment and the interactive digital content 108. The content decision tree may be a logical structure that represents the possible combinations of modular content within an article of interactive digital content 108 in the form of a tree. Branch points in the tree represent instances in the interactive digital content 108 where one of multiple possible modular content elements could be integrated into the interactive digital content 108, creating a branch in the tree corresponding with each possible modular content element. The sentiment integration program 110A, 110B may generate the content decision tree by identifying the points in the interactive digital content 108's run time where each associated modular content element could be mapped into the interactive digital content 108, and creating a tree structure with corresponding branch points.

At 314, the sentiment integration program 110A, 110B modifies the interactive digital content 108 based on the viewer's sentiment and the content decision tree. The sentiment integration program 110A, 110B modifies the interactive digital content 108 by navigating the content decision tree, and at each branch point, choosing a branch based on the predicted content. The sentiment integration program 110A, 110B may integrate the modular content element corresponding with the selected branch into the interactive digital content 108 at the specified point within the interactive digital content 108 to create a linear, seamless viewing experience.

At 316, the sentiment integration program 110A, 110B provides the output of the content decision tree to a machine learning model. Once the sentiment integration program 110A, 110B has navigated the content decision tree and executed each branch point, the sentiment integration program 110A, 110B may send the content decision tree and/or the decision made at each branch point to a machine learning model, to improve sentiment inferences and content modification for future interactive digital content 108 views. In some embodiments, the sentiment integration program 110A, 110B may send the output of the content decision tree into a semi-supervised reinforcement learning module as part of an ensemble learning approach, in order to continuously predict the next reward function based on state parameters, and the content being played for the specific viewer. In some embodiments, the machine learning method may utilize a normalized feature scaling matrix in order to generate the optimal normalized predicted output, considering above state parameters, environmental variables, and a normalized reward function to ameliorate the content output.

Figure 4:
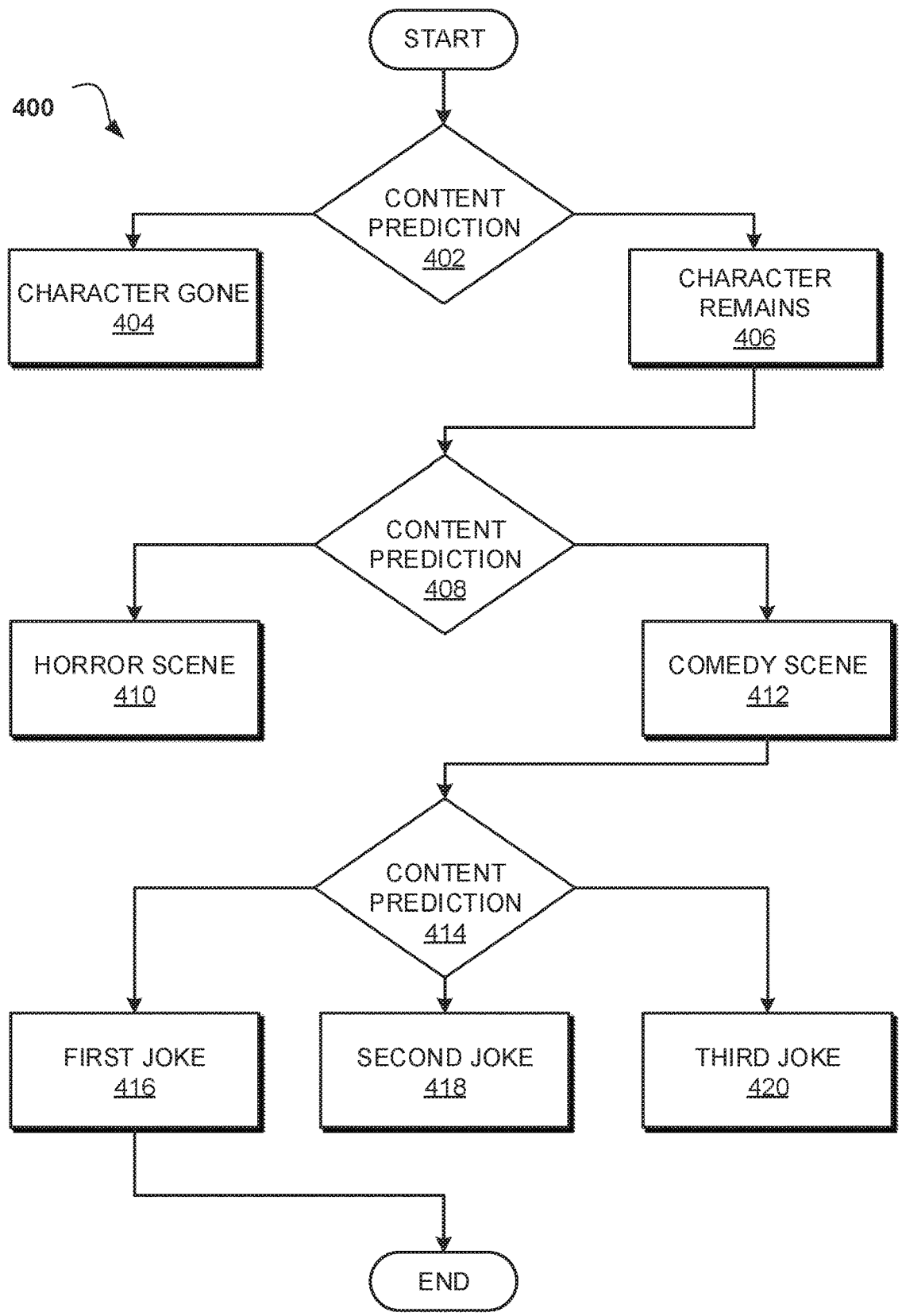
FIG. 4 is an example of a content decision tree according to at least one embodiment.

Referring now to FIG. 4, an example of a content decision tree 400 is depicted according to at least one embodiment. The content decision tree 400 represents the route of the sentiment integration program 110A, 110B through interactive digital content 108. The content decision tree 400 comprises a series of branch points at 402, 408, and 414, each of which corresponds to points within the runtime of the interactive digital content 108 where sentiment integration program 110A, 110B must choose one of multiple articles of modular content to integrate into the interactive digital content 108. At branch point 402, a content provider has provided two pieces of modular content, 404 and 406. At branch point 408, the content provider has provided two optional pieces of modular content, 410 and 412. At branch point 414, the content provider has provided three optional pieces of modular content: 416, 418, and 420. The sentiment integration program 110A, 110B executes through the content decision tree by predicting content to choose at each of the branch points. The first branch point that sentiment integration program 110A, 110B encounters during the presentation of the interactive digital content 108 is branch point 402. At 402, the narrative diverges; a character in the story being told by the interactive digital content 108 may either be banished, or remain. If the character is banished, modular content 404 will be played. If the character is not banished and remains, modular content 406 will be played. Therefore, at 402, sentiment integration program 110A, 110B predicts which of the two options will result in greater viewer satisfaction. In this example, sentiment integration program 110A, 110B determines that the character remaining would produce greater viewer satisfaction, and chooses and plays modular content 406. At 408, sentiment integration program 110A, 110B encounters another branch point, where two possible pieces of modular content are provided, a horror scene 410 and a comedy scene 412. Here, sentiment integration program 110A, 110B again conducts content prediction based on real time viewer sentiment, and determines that the comedy scene would produce greater viewer satisfaction. Proceeding down the corresponding branch, sentiment integration program 110A, 110B reaches branch point 414, where the content provider has provided three potential jokes, first joke 416, second joke 418, and third joke 420. The sentiment integration program 110A, 110B conducts content prediction and determines that the first joke 416 would produce the most satisfaction, and plays first joke 416.

It may be appreciated that FIGS. 2-4 provides only illustrations of individual implementations and do not imply any limitations with regard to how different embodiments may be implemented. Many modifications to the depicted environments may be made based on design and implementation requirements.

Figure 5:
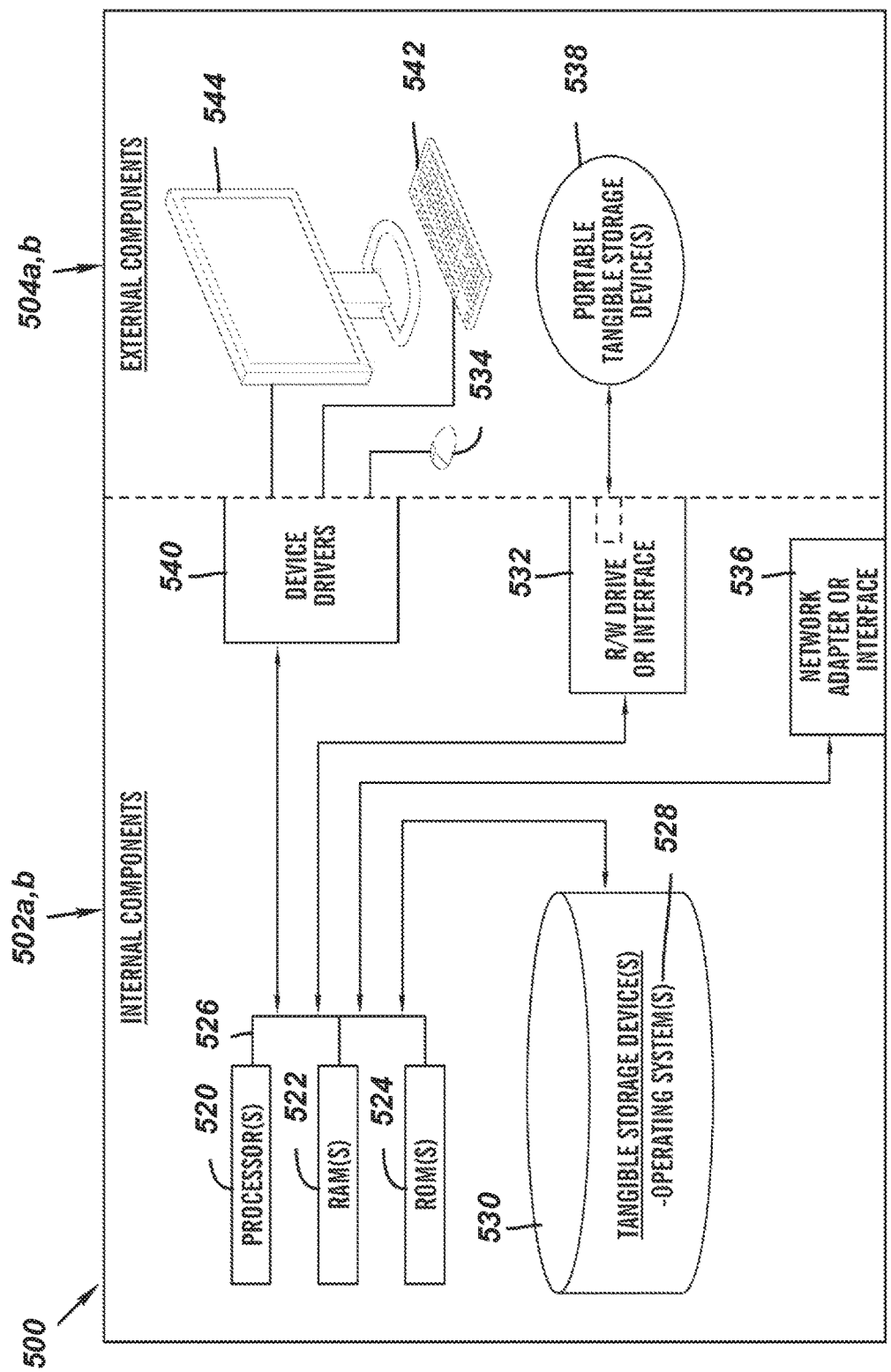
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 *a,b* and external components 504 *a,b* illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the interactive digital content 108 and the sentiment integration program 110A in the client computing device 102, and the sentiment integration program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the sentiment integration program 110A, 110B, can be stored on one or more of the respective portable computer-readable tangible storage devices 538, read via the respective R/W drive or interface 532, and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. The interactive digital content 108 and the sentiment integration program 110A in the client computing device 102 and the sentiment integration program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the interactive digital content 108 and the sentiment integration program 110A in the client computing device 102 and the sentiment integration program 110B in the server 112 are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
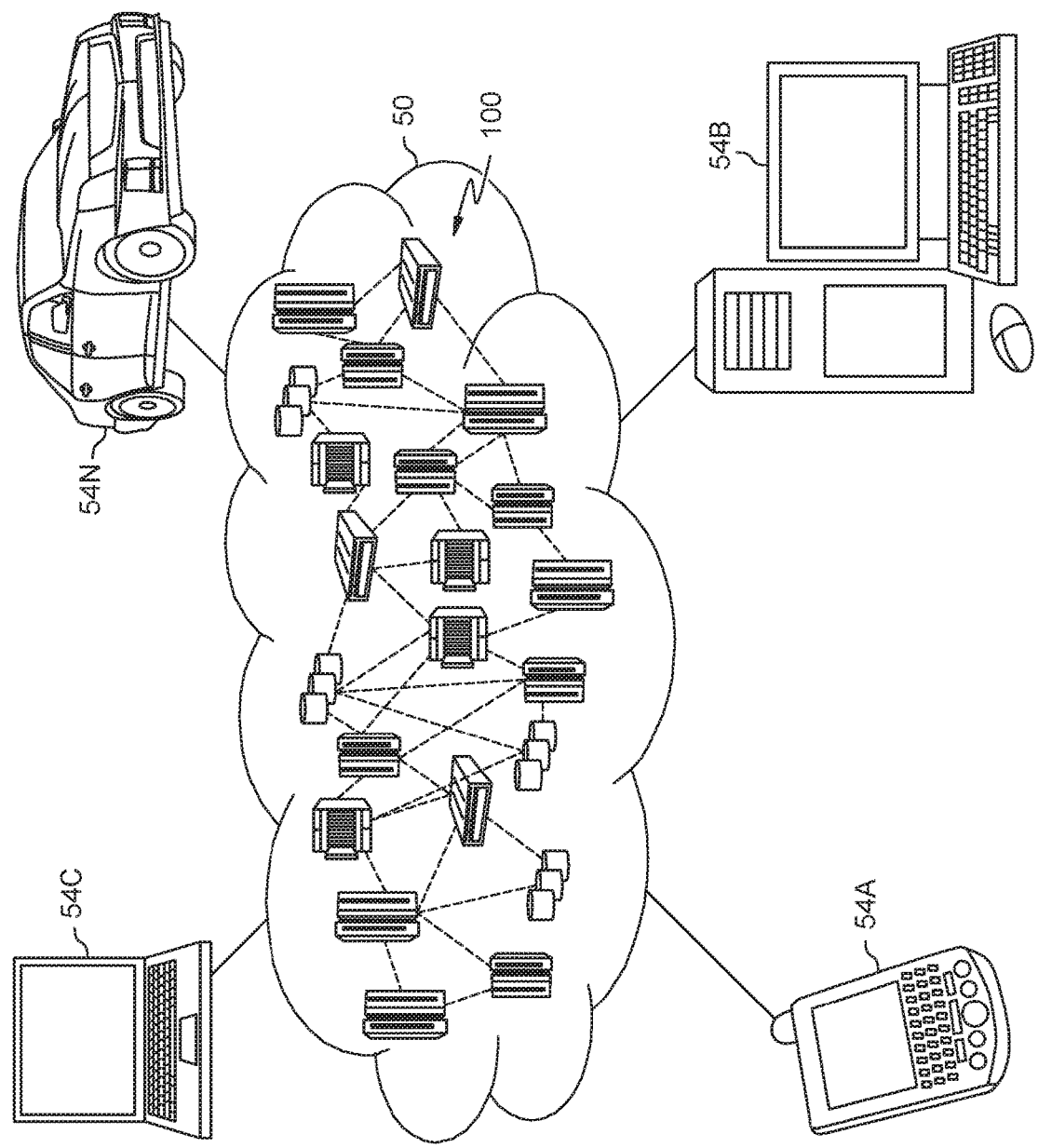
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
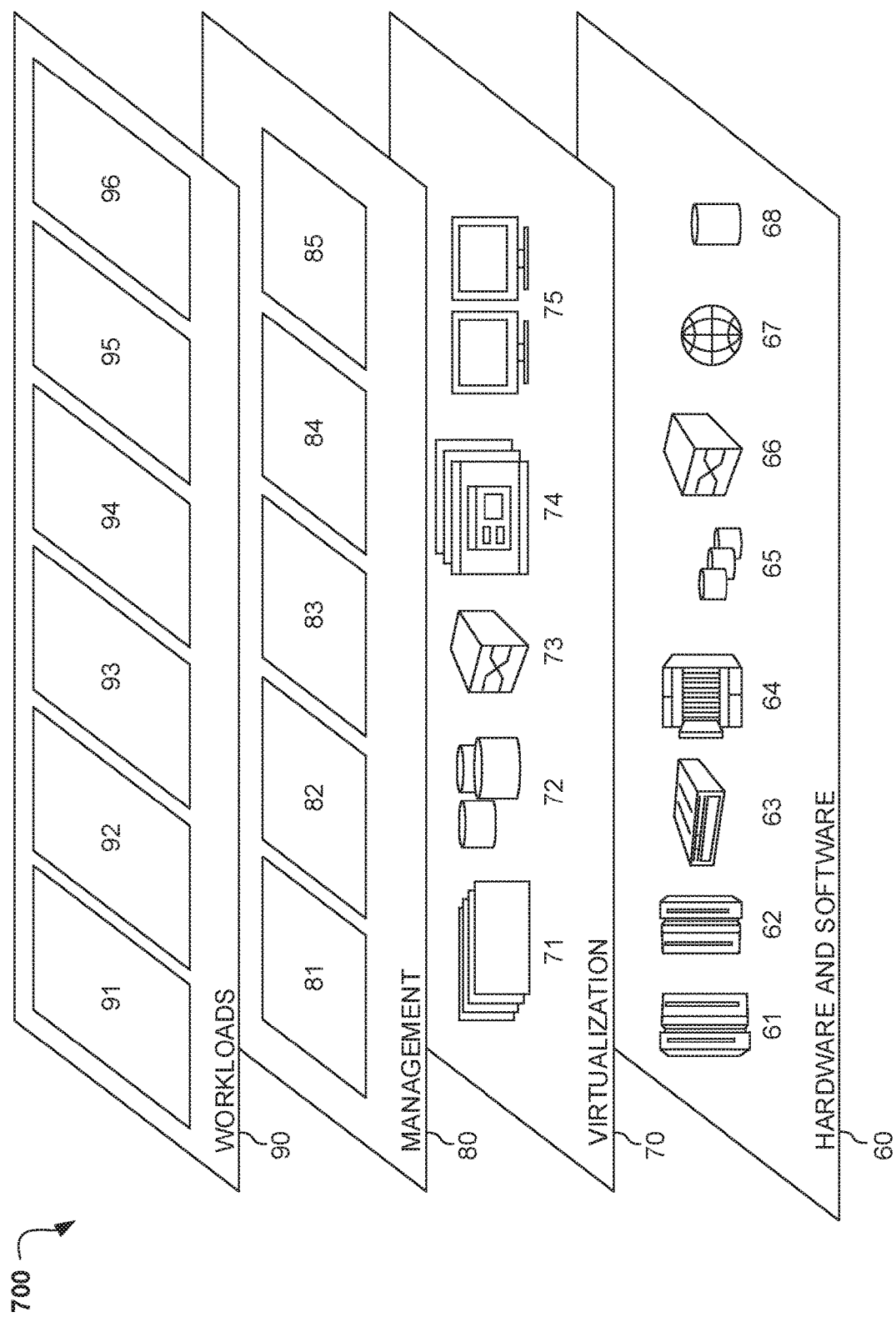
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sentiment integration 96. Sentiment integration 96 may relate to capturing real-time viewer sentiment, and incorporating that sentiment in real-time or near-real-time live interaction for increased viewer engagement with the content being presented.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for dynamically modifying interactive digital content based on viewer sentiment, the method comprising:
measuring, by a plurality of sensors comprising a first camera having a first resolution and a second camera having a second resolution, real-time sentiment metrics of a plurality of viewers associated with a viewed portion of the interactive digital content while the interactive digital content is displayed to the plurality of viewers wherein the plurality of users includes a first user and a second user;
inferring, by a processor, a sentiment of the plurality of viewers with respect to the viewed portion of the interactive digital content based on the measured real-time sentiment metrics wherein the inferring further comprises:
detecting a first sentiment of the first user based on a first image taken by the first camera at the first resolution;
detecting a second sentiment of the second user based on a second image taken by the second camera at the second resolution;
weighting the plurality of viewers by priority, wherein the weighting comprises:
determining that the first resolution of the first camera is less than the second resolution of the second camera;
in response to the determining, assigning a lower weight to the first sentiment than to the second sentiment, such that the first sentiment is assigned to a first, lower weight and the second sentiment is assigned to a second, higher weight;
predicting content satisfying to one or more selected viewers of the plurality of viewers based on the first and second weights and the first and second sentiments, wherein the selected viewers are selected responsive to their assigned weight exceeding a threshold value; and
modifying the interactive digital content in real time by swapping out one or more modular content blocks and modifying one or more individual supporting elements of the interactive digital content based on the predicted content.

2. The method of claim 1, further comprising:
generating a content decision tree based on the interactive digital content.

3. The method of claim 1, further comprising:
identifying a viewer based on the one or more measured real-time sentiment metrics.

4. The method of claim 1, wherein predicting content satisfying to one or more selected viewers is further based on a machine learning model.

5. The method of claim 1, further comprising:
creating a default sentiment model representing a sentiment of one or more viewers.

6. The method of claim 1, wherein the interactive digital content comprises a plurality of modular content.

7. A computer system for dynamically modifying interactive digital content based on viewer sentiment, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, the program instructions comprising:
measuring, by a plurality of sensors comprising a first camera having a first resolution and a second camera having a second resolution, real-time sentiment metrics of a plurality of viewers associated with a viewed portion of the interactive digital content while the interactive digital content is displayed to the plurality of viewers wherein the plurality of users includes a first user and a second user;
inferring, by a processor, a sentiment of the plurality of viewers with respect to the viewed portion of the interactive digital content based on the measured real-time sentiment metrics wherein the inferring further comprises:
detecting a first sentiment of the first user based on a first image taken by the first camera at the first resolution;
detecting a second sentiment of the second user based on a second image taken by the second camera at the second resolution;
weighting the plurality of viewers by priority, wherein the weighting comprises:
determining that the first resolution of the first camera is less than the second resolution of the second camera;
in response to the determining, assigning a lower weight to the first sentiment than to the second sentiment, such that the first sentiment is assigned to a first, lower weight and the second sentiment is assigned to a second, higher weight;
predicting content satisfying to one or more selected viewers of the plurality of viewers based on the first and second weights and the first and second sentiments, wherein the selected viewers are selected responsive to their assigned weight exceeding a threshold value; and
modifying the interactive digital content in real time by swapping out one or more modular content blocks and modifying one or more individual supporting elements of the interactive digital content based on the predicted content.

8. The computer system of claim 7, the program instructions further comprising:
generating a content decision tree based on the interactive digital content.

9. The computer system of claim 7, the program instructions further comprising:
identifying a viewer based on the one or more measured real-time sentiment metrics.

10. The computer system of claim 7, wherein the program instruction of predicting content satisfying to one or more selected viewers is further based on a machine learning model.

11. The computer system of claim 7, the program instructions further comprising:
creating a default sentiment model representing a sentiment of one or more viewers.

12. The computer system of claim 7, wherein the interactive digital content comprises a plurality of modular content.

13. A computer program product for dynamically modifying interactive digital content based on viewer sentiment, the computer program product comprising:
one or more computer-readable tangible storage medium and program instructions stored on at least one of the one or more tangible storage medium, the program instructions executable by a processor to cause the processor to perform a method, the program instructions comprising:
measuring, by a plurality of sensors comprising a first camera having a first resolution and a second camera having a second resolution, real-time sentiment metrics of a plurality of viewers associated with a viewed portion of the interactive digital content while the interactive digital content is displayed to the plurality of viewers wherein the plurality of users includes a first user and a second user;
inferring, by a processor, a sentiment of the plurality of viewers with respect to the viewed portion of the interactive digital content based on the measured real-time sentiment metrics wherein the inferring further comprises:
detecting a first sentiment of the first user based on a first image taken by the first camera at the first resolution;
detecting a second sentiment of the second user based on a second image taken by the second camera at the second resolution;
weighting the plurality of viewers by priority, wherein the weighting comprises:
determining that the first resolution of the first camera is less than the second resolution of the second camera;
in response to the determining, assigning a lower weight to the first sentiment than to the second sentiment, such that the first sentiment is assigned to a first, lower weight and the second sentiment is assigned to a second, higher weight;
predicting content satisfying to one or more selected viewers of the plurality of viewers based on the first and second weights and the first and second sentiments, wherein the selected viewers are selected responsive to their assigned weight exceeding a threshold value; and
modifying the interactive digital content in real time by swapping out one or more modular content blocks and modifying one or more individual supporting elements of the interactive digital content based on the predicted content.

14. The computer program product of claim 13, the program instructions further comprising:
generating a content decision tree based on the interactive digital content.

15. The computer program product of claim 13, the program instructions further comprising:
identifying a viewer based on the one or more measured real-time sentiment metrics.

16. The computer program product of claim 13, wherein the program instruction of predicting content satisfying to one or more selected viewers is further based on a machine learning model.

17. The computer program product of claim 13, the program instructions further comprising:
creating a default sentiment model representing a sentiment of one or more viewers.

* * * * *